Feb. 22, 1927.
F. R. PORTER
1,618,473
INTERNAL COMBUSTION ENGINE
Filed Nov. 25, 1924
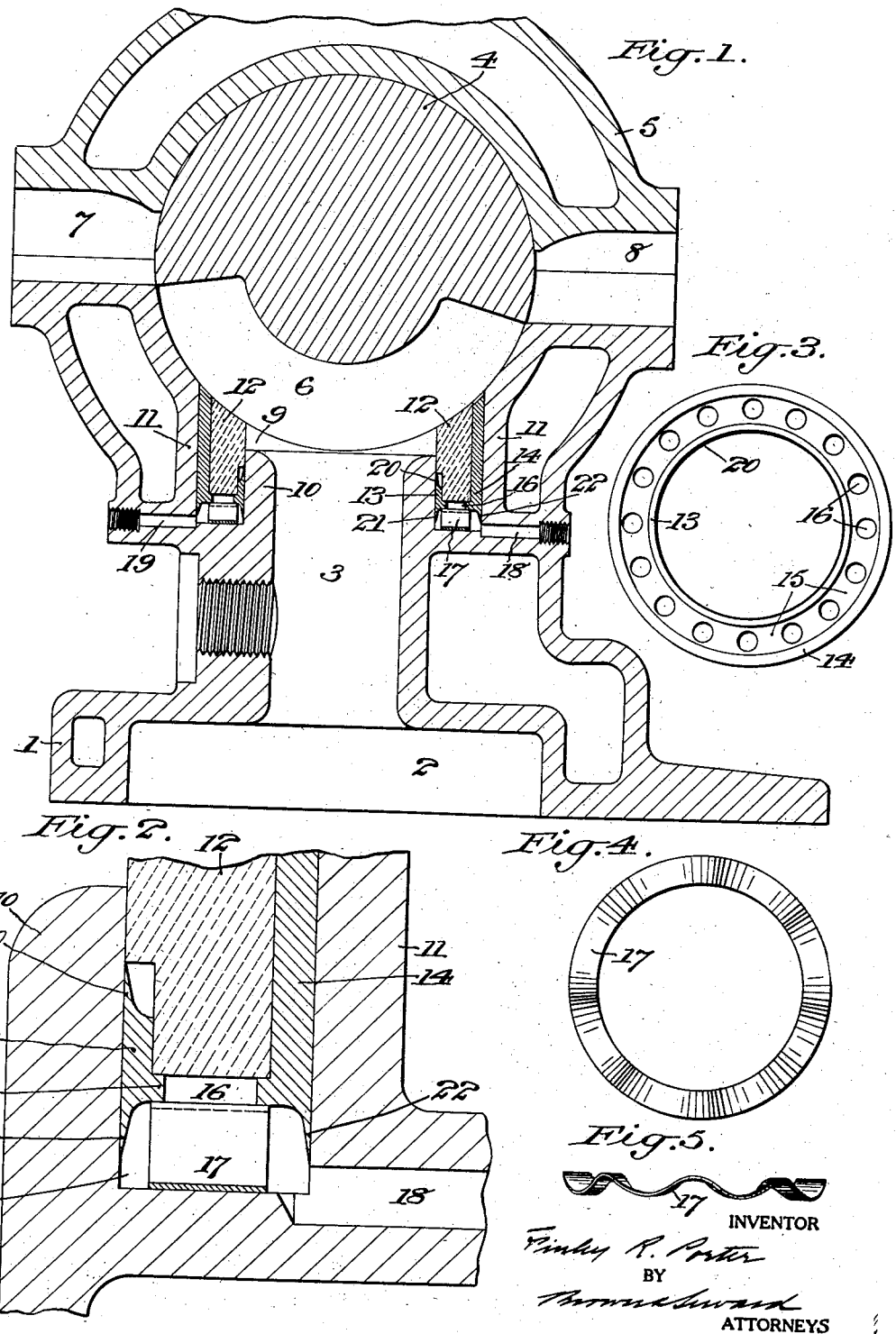

Patented Feb. 22, 1927.

1,618,473

UNITED STATES PATENT OFFICE.

FINLEY R. PORTER, OF NEW YORK, N. Y., ASSIGNOR TO PORTER ENGINE DEVELOPMENT, INC., OF NEW YORK, N. Y., A CORPORATION OF NEW YORK.

INTERNAL-COMBUSTION ENGINE.

Application filed November 25, 1924. Serial No. 752,152.

My invention relates to internal combustion engines and is shown in connection with an internal combustion engine of the rotary valve type in which the cylinder has a common inlet and discharge port, the valve chest has separate inlet and discharge ports and the valve has a peripheral bridge port located in the same plane as the cylinder and valve chest ports.

The object of my invention is to provide a novel packing engaging the valve around the cylinder port for preventing leakage, for ensuring proper lubrication of the parts, for cooling the parts and for providing sufficient pressure of the sealing ring on the valve to obtain a gas-tight engagement without too much friction.

A practical embodiment of my invention is represented in the accompanying drawings, in which—

Fig. 1 represents a vertical cross section through so much of an internal combustion engine of the rotary valve type, as includes my invention.

Fig. 2 represents an enlarged detail cross section at the cylinder port.

Fig. 3 represents a plan view of the sealing ring holder.

Fig. 4 represents a plan view of the packing advancing spring.

Fig. 5 represents an edge view of the same.

The cylinder is denoted by 1, the combustion chamber by 2 and the cylinder port by 3. The valve 4 is rotatably mounted in the valve chest 5, which rotary valve is provided with a peripheral bridge port 6. The valve chest is provided with a motive fluid inlet port 7 and an exhaust port 8 leading, respectively, to and from the face of the rotary valve 4. The ports 3, 6, 7 and 8 are all located in the same plane.

The cylinder 1 is provided with an annular packing chamber 9 surrounding the port 3 between the inner and outer walls 10 and 11 and opening to the face of the rotary valve 4. Within this chamber 9 I locate a packing which surrounds the cylinder port 3. This packing is herein shown as comprising a sealing ring 12 of oil impregnated self-lubricating bearing material such, for instance, as "genalite" and a holder therefor having an inner side wall 13, an outer side wall 14 and a perforated bottom 15, the holes 16 of which open communication between the oil space at the bottom of the packing chamber 9 and the bottom of the sealing ring 12. I employ spring means for advancing the packing, to hold the sealing ring 12 against the face of the valve, which spring means is herein shown as a radially corrugated spring washer 17 located in the space between the bottom of the packing chamber 9 and the bottom 15 of the sealing ring holder.

I provide means for circulating lubricating oil through the space between the bottom of the sealing ring holder and the bottom of the packing chamber so that not only may oil be constantly fed to the sealing ring to be absorbed thereby as required, but also circulated for cooling the packing and the adjacent parts sufficiently to prevent their becoming overheated. This is provided for by the oil inlet passage 18 and the oil outlet passage 19, preferably arranged at points diametrically opposed.

To prevent leakage of the oil or the gas, the inner wall 13 of the sealing ring holder has its top and bottom edges beveled to form thin resilient lips 20, 21 engaging the inner wall of the packing chamber; the bottom edge of the outer wall of the holder being also beveled to form a thin resilient lip 22, snugly engaging the outer wall of the said packing chamber. These lips are slightly sprung so they will snugly engage their respective walls to prevent leakage thereby and carbon deposits thereon.

From the above description it will be seen that I have provided a packing in which the sealing ring of self-lubricating material may be kept impregnated with oil passing through the perforated holder from the supply which is being circulated through the packing chamber for cooling the parts, the spring washer being at all times immersed in the oil to prolong its efficiency. It will also be seen that by providing the sealing ring holder with the thin resilient lips which press snugly against the walls of the packing chamber all liability of leakage past the holder is obviated and carbon deposits prevented on said walls.

It is evident that various changes may be resorted to in the construction, form and arrangement of the several parts without departing from the spirit and scope of my invention; hence, I do not wish to limit myself to the particular embodiment herein shown and described, but—

What I claim is:—

1. In an internal combustion engine, a rotary valve, a packing therefor, spring means for holding the packing against the valve, and means for circulating oil in contact with said packing at a distance from the face of the valve to supply the packing with oil and to cool the parts.

2. In an internal combustion engine, a rotary valve, a packing therefor including a sealing ring of oil impregnated self-lubricating bearing material, spring means for holding the sealing ring against the valve, and means for circulating oil in contact with said sealing ring at a distance from the face of the valve to supply the sealing ring with oil and to cool the parts.

3. In an internal combustion engine, a rotary valve, a cylinder having a port and a chamber surrounding it, a packing around said port within said chamber, said packing including a sealing ring of oil impregnated self-lubricating bearing material and a perforated holder therefor, spring means in said chamber for holding the sealing ring against said valve, and means for circulating oil in said chamber for supplying oil to the sealing ring through said perforated holder and for cooling the parts.

4. In an internal combustion engine, a rotary valve, a cylinder having a port and a chamber surrounding it, a packing around said port within said chamber, said packing including a sealing ring of oil impregnated self-lubricating bearing material and a perforated holder therefor, spring means in said chamber for holding the sealing ring against said valve, and means for circulating oil in said chamber for supplying oil to the sealing ring through said perforated holder and for cooling the parts, the inner wall of said holder having top and bottom thin resilient lips snugly engaging the inner side wall of the chamber to prevent oil and gas leakage thereby.

5. In an internal combustion engine, a rotary valve, a cylinder having a port and a chamber surrounding it, a packing around said port within said chamber, said packing including a sealing ring of oil impregnated self-lubricating bearing material and a perforated holder therefor, spring means in said chamber for holding the sealing ring against said valve, and means for circulating oil in said chamber for supplying oil to the sealing ring through said perforated holder and for cooling the parts, the inner wall of the holder having top and bottom resilient lips snugly engaging the inner wall of the chamber and the outer wall of the holder having a lower resilient lip snugly engaging the outer wall of the chamber for preventing oil and gas leakage thereby.

6. In an internal combustion engine, a rotary valve, a cylinder having a port and a chamber surrounding it, oil supply and discharge passages leading to and from said chamber, a packing around said port within said chamber, said packing including a sealing ring of oil impregnated self-lubricating bearing material and a holder therefor having a perforated bottom, and a radially corrugated spring washer located between the bottom of the holder and the bottom of the chamber for holding the sealing ring against the valve to permit oil to flow into contact with the sealing ring through the perforated bottom of the holder.

7. In an internal combustion engine, a rotary valve, a cylinder having a port and a chamber surrounding it, oil supply and discharge passages leading to and from said chamber, a packing around said port within said chamber, said packing including a sealing ring of oil impregnated self-lubricating bearing material and a holder therefor having a perforated bottom, and a radially corrugated spring washer located between the bottom of the holder and the bottom of the chamber for holding the sealing ring against the valve to permit oil to flow into contact with the sealing ring through the perforated bottom of the holder, said holder being provided with thin resilient lips snugly engaging the side walls of the chamber for preventing oil and gas leakage thereby.

In testimony, that I claim the foregoing as my invention, I have signed my name this 21st day of November, 1924.

FINLEY R. PORTER.